United States Patent Office

2,876,104
DIETETIC FROZEN FOOD COMPOSITION

Irene D. Bliudzius, Chicago, Ill., Norman P. Rockwell, Wilmington, Del., and Pranas Jucaitis, Chicago, Ill., assignors, by direct and mesne assignments, to E. I. du Pont de Nemours and Company, Wilmington, Del., a corporation of Delaware No Drawing. Application March 25, 1957
Serial No. 647,959

8 Claims. (Cl. 99—136)

This invention is directed to low calorie and diabetic frozen food compositions which contain a Polyose as a non-nutritive freezing-point depressant.

Frozen desserts such as ice cream, ice milk, sherbets and water ices have substantial nutritive values, mostly in the form of sugars and fats. To prepare low calorie or low carbohydrate frozen desserts it is necessary to replace as much of the nutritive matter normally present as possible without altering substantially the palatability characteristics associated with conventional desserts. To replace sugar and fat, it is necessary to use as replacements substances which are not only non-nutritive but which also have virtually the same effect upon the physical nature of the dietetic product as do sugar and fat in conventional frozen desserts.

In conventional frozen desserts sugar, besides contributing sweetness, also helps in lowering the freezing point of the product. Sugar affects the freezing point not only by contributing to total product solids, particularly in low fat content frozen desserts, but also by affecting product texture and freezing and melting characteristics. Fat in frozen desserts not only increases viscosity of the mix by contributing to total product solids but also gives good body and texture characteristics by influencing, for example, product hardness.

In general, insofar as physical effects are concerned, the lower the fat content, the greater the effect of sugar upon the product. The relationship between sugar content and fat content in frozen desserts is illustrated in Table I, which shows the average composition of, respectively, ice cream, ice milks, sherbet, and water ice, in terms of sugar, fat, milk-solids-non-fat, and total solids. The table demonstrates that when fat content is diminished, as usually occurs in the preparation of dietetic frozen desserts, the sugar content becomes an increased percentage of total solids. Hence, the lower the fat content, the greater the effect of sugar upon the physical properties of the products usually containing it.

To prepare a dietetic low calorie or low carbohydrate frozen dessert, then, a non-nutritive substance or substances must be used in place of sugar which closely resemble sugar in capacity to affect product freezing and melting characteristics.

This invention relates to diatetic frozen food compositions containing a non-nutritive freezing point depressant having a volume, consistency and appearance comparable to food compositions containing usual nutritive freezing point depressants, such as sugar. These non-nutritive freezing point depressants are used like sugar but usually in smaller quantities. To this non-nutritive frozen food one may add a non-caloric sweetener to obtain a sweetness level which one is accustomed to obtain with sugar. Thus, low calorie and carbohydrate frozen desserts can be made which are easily and pleasantly usable as conventional sugar containing foodstuffs.

The frozen desserts which can be prepared using a non-nutritive Polyose as a freezing-point depressant include ice cream, ice milk, sherbet and water ice.

In such foodstuffs a low fat content is usually used and such fat as remains can be furnished by conventional sources, such as creams (including sweet, frozen or plastic), unsalted butter or butteroil. The milk-solids-non-fat, or "serum solids" can be furnished by using whole milk, skim milk, dried whole or skim milk or concentrated whole or skim milk. Contributing to the milk-solids-non-fat present, of course, are those serum solids in any cream used.

The Polyose is used in place of the bulk sugar normally added to a mix because the resulting frozen product has substantially all of the palatability qualities of the conventional nutritive counterpart.

Thus, instead of using cane, beet, corn, invert, or perhaps malt sugar, a Polyose is added in an amount sufficient to give the product the desired physical characteristics. Occasionally other substances as described more fully below are added to enhance palatability characteristics.

A Polyose is a glucose polymer solid derived from starch by depolymerization followed by heat polymerization as described in detail in the Durand Patent 2,563,014. The Polyoses are sold by the Corn Products Refining Company. The Polyoses have a considerably different

TABLE I

| Composition | Ice Cream | | | Ice Milk | | | Sherbets | | | Water Ices | | |
|---|---|---|---|---|---|---|---|---|---|---|---|---|
| | Percent | Cal./pt.[1] | Percent Cal. | Percent | Cal./pt.[1] | Percent Cal. | Percent | Cal./pt.[2] | Percent Cal. | Percent | Cal./pt.[3] | Percent Cal. |
| Fat | 12 | 308 | 53 | 4 | 102 | 25 | 2 | 66 | 12 | 0 | 0 | 0 |
| MSNF [4] | 10 | 103 | 18 | 12 | 123 | 30 | 3 | 39 | 7 | 0 | 0 | 0 |
| Sugar | 15 | 171 | 29 | 16 | 182 | 45 | 32 | 464 | 81 | 35 | 570 | 100 |
| Total Solids | 37 | 582 | 100 | 32 | 407 | 100 | 37 | 569 | 100 | 35 | 570 | 100 |

[1] At 80% overrun.
[2] At 40% overrun.
[3] At 20% overrun.
[4] Milk-solids-non-fat.

susceptibility to amylolytic enzymes than the original starch of its conventional degradation products. The products on test contain groups which act like very small amounts of reducing sugar, not in excess of about 5 to 7 percent in Polyose A. The reducing sugar is not construed as due to the presence of free glucose.

A preferred Polyose for purposes of the invention is Polyose C which can be described as a glucose polymer derived from starch by depolymerization followed by heat polymerization to such an extent that at 50 percent solids it gives a viscosity (Brookfield) of 20–100 poises at 70° F. More viscous or less viscous Polyoses can be used. Polyose A requires 67 percent, Polyose B, 60 percent, and Polyose D requires only 40 percent of solids to give a viscosity equivalent to that of Polyose C.

Due to the wide range of frozen dessert type products that can be produced and the various combinations of ingredients used therein, the exact amount of Polyose that can be used in these products varies considerably. The amount used is dependent upon the product desired and other constituents present in the frozen dessert formula invloved. Generally, however, the amount of Polyose that can be used in a frozen dessert type composition varies from about 1 to 40%; more narrowly 5-30% by weight is used. The result is a dietetic foodstuff which has a low carbohydrate or low calorie content but which has normally high nutritive value as regards protein, mineral and vitamin content. The product is particularly useful for persons who must watch their calorie and carbohydrate intake.

Non-caloric sweetener compositions which can be added to Polyose containing frozen desserts to keep the product at its normal sweetness level include a non-caloric sweetener such as cyclamate and saccharin. The cyclamate can be any of the salts N-cyclohexysulfamic acid or the acid itself as described in Audrieth Patent 2,275,125. Of the salts, it is preferred to use an alkali salt such as calcium, sodium, potassium, magnesium, ammonium cyclamate and the like. Sorbitol can also be added to a mixture of non-caloric sweetening agents as shown in the Gordon Patents 2,629,665 and 2,653,105. Substances like sorbitol are nutritive so too much of them should not be used.

Mixtures of cyclamate and saccharin can be substituted for the cyclamate only, provided one bears in mind the fact that saccharin is about 10 times sweeter than cyclamate. If a mixture of cyclamate in saccharin is used the range of amounts of non-nutritive sweetening agents used can be defined as follows:

(1) Weight percent of cyclamate+10×weight percent of saccharin=.02 to 1 weight percent of product More narrowly:

(2) Weight percent of cyclamate+10×weight percent of saccharin=.1 to .6 weight percent of product Either cyclamate or saccharin can be used to the exclusion of the other. Formulas 1 and 2 (above) remain correct when the weight percent of either cyclamate or saccharin is equal to zero. One preferred mixture of sweetening agents contains an alkali cyclamate such as sodium or calcium cyclamate used with saccharin in a cyclamate:saccharin weight ration of 10:1.

Still other proportions of the low calorie sweeteners can be used as set out in the Gordon patents previously mentioned. In each instance, the quantities to be used in a particular food composition of this invention can readily be determined by reference to the sweetness level of such food composition when prepared with usual sweetening agents. The dietetic food composition may be made more or less sweet than the non-dietetic food composition as desired.

The relationship between the amount of Polyose used and the amount of cyclamate and saccharin mixture used in the product may be defined as follows:

(3)
$$\frac{\text{Weight percent of polyose}}{\text{Weight percent of cyclamate} + 10 \times \text{weight percent of saccharin}} = 1\text{-}1000$$

More narrowly:

(4)
$$\frac{\text{Weight percent of polyose}}{\text{Weight percent of cyclamate} + 10 \times \text{weight of saccharin}} = 10\text{-}300$$

In addition to Polyose, varying amounts of other ingredients can be used in the frozen food compositions invention, many of them in ways well understood in the art. For example, to freeze ice and ice creams successfully at home refrigerator temperature conditions it is sometimes advisable to add a thickener such as one of the following: gelatin, flour, corn starch, eggs, gum acacia, methyl cellulose, and other natural and synthetic gums. Some of these substances are nutritive and too much should not be used.

Other substances can also be added to help prevent an icy consistency and promote a palatable blend, such as corn syrup, honey, inorganic salts of various kinds, hydrolyzed protein, glycerine and the like. While these substances are also valuable as freezing point depressants some are nutritive and too much of them should not be used.

Stabilizers and emulsifiers can also be used, such as gelatin, pectin, carboxymethyl cellulose, sodium carboxymethyl cellulose, sodium alginate, gum tragacanth, karaya gum, starch, locust bean gum, Irish moss and the like.

In the non-limitative examples that follow, the various ingredients used in preparing the dessert mix are usually weighed and mixed while cold. The mix is then pasteurized by heating it in a container or vat to a temperature of from 150° to 165° F. and held at this pasteurization temperature for about 30 minutes. The mix can then be homogenized at pasteurization temperature at a pressure of from 2,000 to 3,500 pounds per square inch. Homogenation prevents the churning in the freezer of any fat present and thus improves the whipping properties of the mix and the texture of the finished product. The mix is then frozen in the usual manner.

Examples of formulas for low caloric, dietetic frozen desserts made according to this invention are as follows:

*Example 1*

LOW CALORIE ICE CREAM

|  | Percent | Gms. (Pint—522 gms.) |
|---|---|---|
| Fat | 12 | 62.64 |
| Milk-solids-non-fat | 10 | 52.20 |
| Polyose | 15 | 78.30 |
| Sodium Carboxy Methyl Cellulose | 0.3 | 1.57 |
| Calcium Cyclamate | 0.2 | 1.04 |
| Water | 62.3 | 325.21 |
| Vanilla | .2 | 1.04 |
|  | 100.0 | 522.00 |

The fat and the milk-solids-non-fat are supplied by concentrated whole milk and skim milk.

*Example 2*

LOW CALORIE ICE MILK

|  | Percent | Gms. (Pint—522 gms.) |
|---|---|---|
| Fat | 6 | 31.32 |
| Milk-solids-non-fat | 12 | 62.64 |
| Polyose | 5 | 26.10 |
| Sorbitol | 5 | 26.10 |
| Glycerine | 2 | 10.44 |
| Karaya Gum | 0.128 | .67 |
| Sodium Alginate | 0.128 | .67 |
| Calcium Cyclamate | .06 | .31 |
| Saccharin | .004 | .02 |
| Water | 65.68 | 342.85 |
| Choc. Flavoring | 4.0 | 20.88 |
|  | 100.0 | 522.00 |

Condensed skim milk supplies the fat and the milk-solids-non-fat, together with concentrated whole milk.

Example 3
LOW CALORIE ICE MILK

|  | Percent | Gms. (Pint—522 gms.) |
|---|---|---|
| Fat | 4 | 20.88 |
| Milk-solids-non-fat | 13 | 67.86 |
| Polyose | 16 | 83.52 |
| Stabilizer | 0.26 | 1.36 |
| Emulsifier | 0.10 | .52 |
| Calcium Cyclamate | 0.33 | 1.72 |
| Water | 66.06 | 344.83 |
| Vanilla | .25 | 1.31 |
|  | 100.00 | 522.00 |

The source of the fat for this mix is pasteurized cream testing about 30% butterfat and the balance of the milk-solids-non-fat is provided by condensed skim milk.

Example 4
LOW CALORIE SHERBET

|  | Percent | Gms. (Pint—522 gms.) |
|---|---|---|
| Fat | 1.5 | 7.83 |
| Milk-solids-non-fat | 3.0 | 15.66 |
| Polyose | 34.0 | 177.48 |
| Gelatin | 0.5 | 2.61 |
| Calcium Cyclamate | 0.05 | .26 |
| Water | 58.37 | 304.69 |
| Orange Juice (conc. 3:1) | 2.58 | 13.47 |
|  | 100.0 | 522.00 |

The fat and part of the milk-solids-non-fat are supplied by fresh homogenized whole milk testing 3.2% butterfat.

Example 5
LOW CALORIE WATER ICE

|  | Percent | Gms. (Pint—522 gms.) |
|---|---|---|
| Polyose | 25.0 | 130.5 |
| Glucose | 7.0 | 36.54 |
| Gum Tragacanth | 0.4 | 2.09 |
| Calcium Cyclamate | 0.5 | 2.61 |
| Water | 64.52 | 336.79 |
| Orange Juice | 2.58 | 13.47 |
|  | 100.0 | 522.00 |

No pasteurization step preceded the freezing and whipping operation.

We claim:

1. A dietetic frozen food composition containing between 5 and 30 composition weight percent of a glucose polymer non-nutritive freezing point depressant derived from starch by heat depolymerization followed by heat polymerization to such an extent that between 40 and 67 percent solids in water give a viscosity of 20–100 poises at 70° F., the composition also containing a sweetener selected from the group consisting of saccharin and cyclamate.

2. The composition of claim 1 wherein the weight percent of any cyclamate used plus ten times the weight percent of any saccharin used equals 0.1 to 0.6 weight percent of the composition.

3. The dietetic frozen food composition of claim 1 wherein the composition is an ice cream.

4. The dietetic frozen food composition of claim 1 wherein the composition is an iced milk.

5. The dietetic frozen food composition of claim 1 wherein the composition is a sherbet.

6. The dietetic frozen food composition of claim 1 wherein the composition is a water ice.

7. A dietetic frozen food composition comprising between about 1 and 40% by weight of a glucose polymer derived from starch by depolymerization followed by heat polymerization to such an extent that between 40 and 67% solids give a viscosity of 20 to 100 poises at 70° F., and from about 0.02 to 1% by weight of at least one sweetening agent selected from the group consisting of cyclamates and saccharin.

8. A dietetic frozen food composition comprising a glucose polymer derived from starch by depolymerization followed by heat polymerization to such an extent that between 40 and 67% solids give a viscosity of 20 to 100 poises at 70° F. as a non-nutritive freezing point depressant from about 0.02 to 1% by weight of a non-nutritive sweetening agent selected from the group consisting of cyclamate and saccharin, such that:

Weight percent of cyclamate+10×weight percent of saccharin=.02 to 1 weight percent of product

References Cited in the file of this patent
UNITED STATES PATENTS

| 1,801,053 | Miegs | Apr. 14, 1931 |
| 2,002,963 | Schade | May 28, 1935 |
| 2,302,511 | Wallach | Nov. 17, 1942 |
| 2,423,600 | Landers | July 8, 1947 |
| 2,511,609 | Weast | June 13, 1950 |
| 2,563,014 | Durand | Aug. 7, 1951 |
| 2,629,665 | Gordon | Feb. 24, 1953 |

UNITED STATES PATENT OFFICE
CERTIFICATE OF CORRECTION

Patent No. 2,876,104                                            March 3, 1959

Irene D. Bliudzius et al.

It is hereby certified that error appears in the printed specification of the above numbered patent requiring correction and that the said Letters Patent should read as corrected below.

Column 3, line 49, for "weight ration" read -- weight ratio --.

Signed and sealed this 8th day of September 1959.

(SEAL)
Attest:

KARL H. AXLINE
Attesting Officer

ROBERT C. WATSON
Commissioner of Patents